(12) United States Patent
Condito

(10) Patent No.: US 7,282,898 B2
(45) Date of Patent: Oct. 16, 2007

(54) INTEGRATED CIRCUIT CAPABLE OF BALANCED POLYPHASE POWER REGULATION USING REDUNDANT FEEDBACK CIRCUITRY

(75) Inventor: Vincent Condito, Palo Alto, CA (US)

(73) Assignee: Nexsem, Inc., Irvine, CA (US)

( * ) Notice: Subject to any disclaimer, the term of this patent is extended or adjusted under 35 U.S.C. 154(b) by 269 days.

(21) Appl. No.: 11/166,408

(22) Filed: Jun. 24, 2005

(65) Prior Publication Data

US 2006/0290332 A1 Dec. 28, 2006

(51) Int. Cl.
*G05F 1/00* (2006.01)
(52) U.S. Cl. ............... 323/272; 323/225; 323/282; 363/65
(58) Field of Classification Search ........ 323/225, 323/272, 282; 363/65
See application file for complete search history.

(56) References Cited

U.S. PATENT DOCUMENTS 6,278,263 B1 * 8/2001 Walters et al. ............ 323/272

\* cited by examiner

*Primary Examiner*—Karl Easthom
*Assistant Examiner*—Ramy Ramadan
(74) *Attorney, Agent, or Firm*—Grossman, Tucker, Perreault & Pfleger PLLC

(57) ABSTRACT

A method according to one embodiment may include providing a redundant feedback circuit. The method of this embodiment may also include coupling the redundant feedback circuit to a feedback control loop and decoupling a feedback circuit from the feedback control loop. The method of this embodiment may also include calibrating the feedback circuit. The method of this embodiment may also include recoupling the feedback circuit to the feedback control loop and decoupling the redundant feedback circuit from the feedback control loop. Of course, many alternatives, variations, and modifications are possible without departing from this embodiment.

16 Claims, 6 Drawing Sheets

INTEGRATED CIRCUIT CAPABLE OF BALANCED POLYPHASE POWER REGULATION USING REDUNDANT FEEDBACK CIRCUITRY

FIELD

The present disclosure relates to an integrated circuit capable of balanced polyphase power regulation using redundant feedback circuitry.

BACKGROUND

One conventional microprocessor power supply includes a controllable 3-phase power supply. The conventional power supply includes a feedback control loop that operates to change the power delivered to the load based on load conditions. Each phase of the power supply may be controlled separately or they may be slaved to work off of a master phase so that they track and match in performance. However, each feedback loop is typically highly susceptible to offset errors and other errors that may affect the overall control accuracy of the power supply. To correct these errors, the conventional power supply has to rely on proper layout to provide the best matching possible. Since the input signals are very small, even good layout techniques are not sufficient to provide good matching between the different phases.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
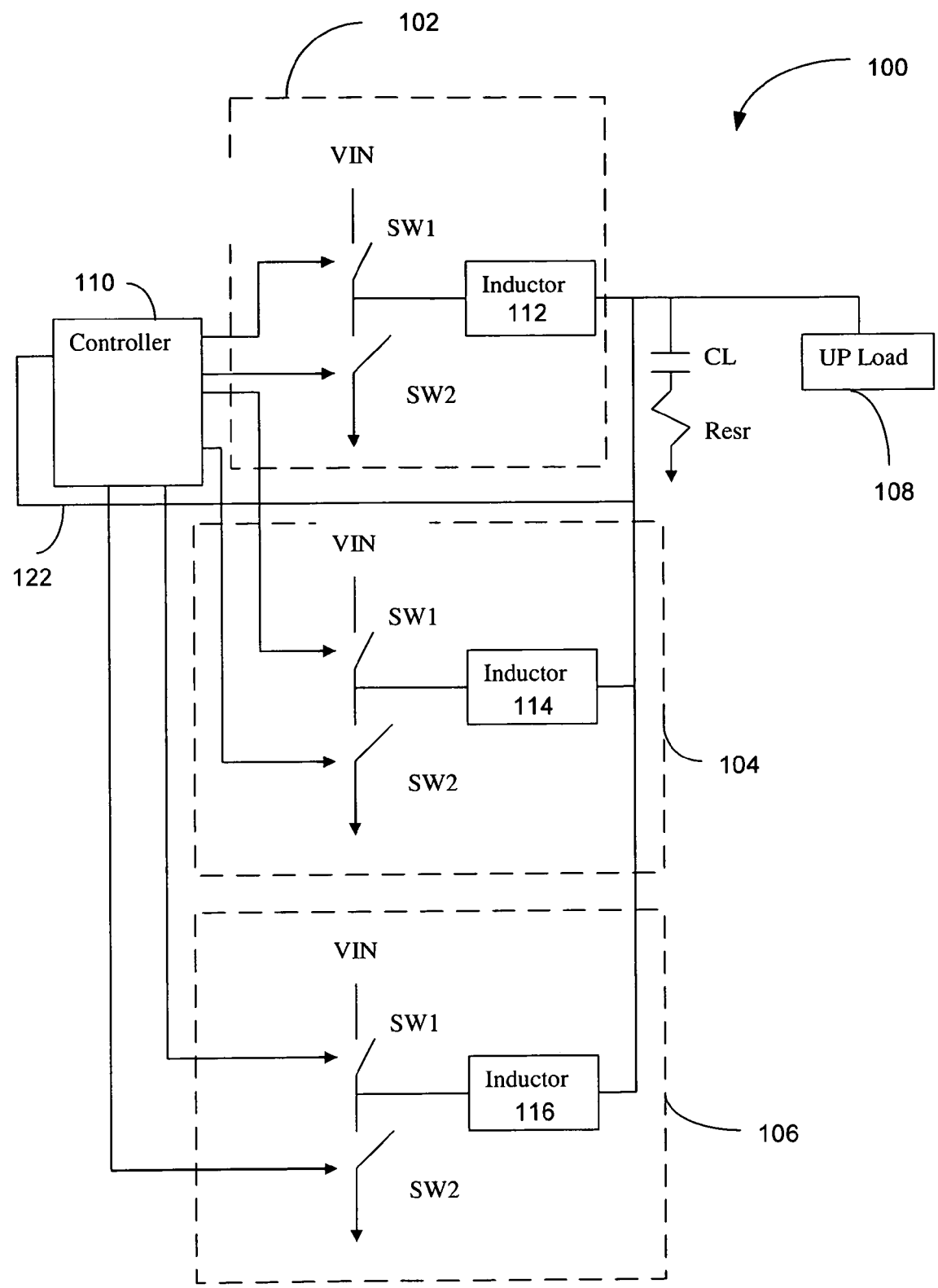
FIG. 1 is a diagram illustrating a system embodiment.

FIG. 1 illustrates a system embodiment 100 of the claimed subject matter. The system 100 may generally include a three phase power supply for a load 108. The system 100 may include controller circuitry 110 which may be capable of controlling the operation of power supply leg circuitry 102, 104 and 106 to deliver power to a load 108. As used in any embodiment herein, "circuitry" or "circuit" may comprise, for example, singly or in any combination, hardwired circuitry, programmable circuitry, state machine circuitry, and/or firmware that stores instructions executed by programmable circuitry. Controller circuitry 110 may be embodied as, or form part of, one or more integrated circuits. "Integrated circuit", as used in any embodiment herein, means a semiconductor device and/or microelectronic device, such as, for example, a semiconductor integrated circuit chip.

First power supply leg 102 (phase A), second power supply leg 104 (phase B) and third power supply leg 106 (phase C) may form a three phase power supply to deliver three phase power to load 108. The first, second and third power supply legs (102, 104 and 106) may each comprise switching DC to DC converter circuitry, for example, as may be formed by high side switch SW1, low side switch SW2, inductor circuitry (112, 114 and 116, respectively) and output capacitor CL and output resistor Resr. Switching DC-to-DC converter circuitry may comprise, for example, Buck regulator circuitry, boost regulator circuitry, Buck-boost regulator circuitry, and/or other DC-DC switching topologies and/or after-developed switching topologies.

Each power leg (phase A, B and C) may each include switches (labeled SW1 and SW2) that operate in a pulse width modulation (PWM) mode to generate a rectangular waveform from a DC source VIN. The rectangular waveform generated by switches SW1 and SW2 in each phase may be applied across a respective inductor circuitry (112, 114 and 116, respectively) and capacitor circuitry (C1 and its equivalent series resistance represented by Resr) to deliver DC power to the load. Switches SW1 and SW2 may each comprise a field effect transistor (FET) and/or a bi-polar junction transistor (BJT), and/or other switch topologies that may be commercially available. As is well known, switches SW1 and SW2 may operate using a respective PWM signals (as may be generated by controller circuitry 110) to convert the DC signal VIN to a rectangular AC signal, which in turn, is converted to a DC signal across a respective inductor circuitry and a capacitor/resistor circuitry. In this embodiment, controller circuitry 110 may control the operation of phase A, B and C to operate in a three phase manner, for example, operating 120 degrees apart, so that three phase power is delivered to the load 108.

Controller circuitry 110 may be capable of generating PWM signals to each switch SW1 and SW2 in each phase A, B, and C. The duty cycle of the PWM signals may operate to control power to each power supply leg and to load 108. System 100 may also include a feedback signal line 122 which may deliver feedback information to controller 110, indicative of power supplied to the load 108 via each leg 102, 104 and 106. Controller 110 may use the feedback signal to adjust the duty cycle of the PWM signals. In at least one embodiment described herein, the load 108 may comprise a system microprocessor, such as such as an Intel® Pentium® IV processor commercially available from Intel Corporation. Of course, the present disclosure is not limited in this respect, and load 108 may comprise any variety of processors known in the art or any other type of load which may benefit from multi-phase power.

Figure 2:
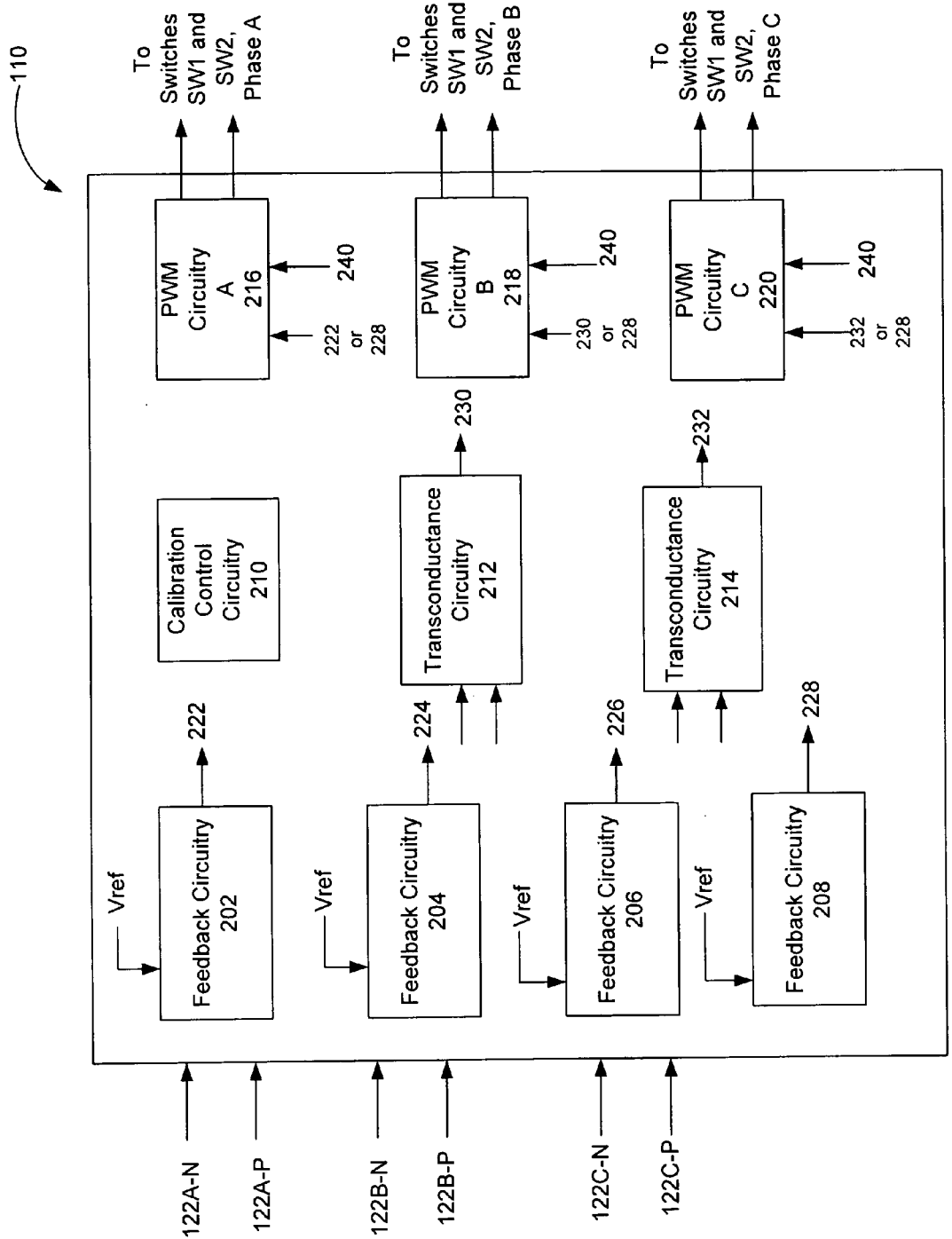
FIG. 2 is a diagram illustrating exemplary controller circuitry.

FIG. 2 is a diagram illustrating exemplary controller circuitry 110. In FIG. 2, certain portions of the system 100 depicted in FIG. 1 have been omitted for clarity (for example, switching circuitry legs 102, 104 and 106, inductor circuitry 112, 114 and 116 and load 108), but it is to be understood that like parts of FIG. 2 can be implemented in a manner consistent with an embodiment depicted in FIG. 1, or alternatively in other system implementations, without departing from this embodiment.

Controller circuitry 110 may include first feedback circuitry 202, second feedback circuitry 204, third feedback circuitry 206, and redundant feedback circuitry 208. Each of the circuits 202, 204, 206 and 208 may be substantially identical and each may comprise differential amplifier circuitry (not shown in this Figure) that may be capable of sensing the inductor current of a respective inductor circuitry 112, 114 or 116. Each of the circuits 202, 204, 206 and 208 may be capable of generating an output control signal 222, 224, 226 and 228, respectively, indicative of the current in a respective inductor circuitry 112, 114 or 116. Each of the circuits 202, 204, 206 and 208 may also be capable of being calibrated to reduce or eliminate any offset errors or other errors which may be associated with differential amplifier circuitry comprised in each of the circuits 202, 204, 206 and 208. The output control signal 222, 224, 226 and 228, generated by one or more of the circuits 202, 204, 206 and 208 may be used to control the duty cycle of the PWM signals generated by controller 110 to control the power delivered to the load, in a manner described in more detail below.

Figure 4A:
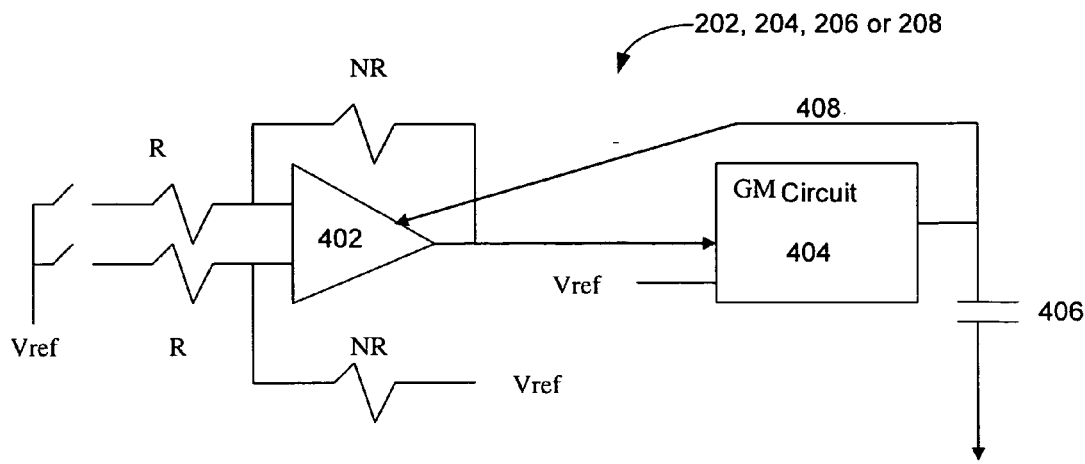
FIG. 4A is a diagram illustrating exemplary feedback circuitry.

Controller 110 may also include PWM circuitry A 216 that may generate PWM signals to control switches SW1 and SW2 of phase A (corresponding to circuit 102). Likewise, PWM circuitry B 218 may generate PWM signals to control switches SW1 and SW2 of phase B (corresponding to circuit 104) and PWM circuitry C 220 may generate PWM signals to control switches SW1 and SW2 of phase C (corresponding to circuit 106). Referring briefly to FIG. 4C, each PWM circuit 216, 218 and 220 may include amplifier circuitry 414 that receives a signal 222, 228 or 230, 230 from feedback circuitry 202 (or 208) or circuitry 212, 214 (described below), and a sawtooth signal 240. The intersection of these two signals via comparator 414 may generate a first PWM signal for switch SW1 and a complementary PWM signal (via an inverter) for switch SW2, and the duty cycle of the PWM signals may be dictated by the value of the DC signal 222, 228, 230 or 232. The operation of the circuit of FIG. 4C is well understood in the art, and further description thereof is omitted.

Feedback circuitry 202 may receive a differential pair of signals 122A-N and 122A-P which may represent the current in inductor circuit 112, corresponding to power conditions in phase A of the three phase power supply of FIG. 1. Feedback circuitry 202 may generate a DC output control signal 222 indicative of, or proportional to, the current in the inductor circuit 112. PWM circuitry A 216 may compare the DC output control signal 222 with an oscillation signal 240 (which may comprise, for example, a sawtooth waveform signal), in a manner well understood in the art, to adjust the duty cycle of the PWM signals for phase A. Feedback circuitry 204 may receive a differential pair of signals 122B-N and 122B-P which may represent the current in inductor circuit 114, corresponding to power conditions in phase B of the three phase power supply of FIG. 1. Feedback circuitry 204 may generate a DC output control signal 224 indicative of, or proportional to, the current in the inductor circuit 114. Similarly, feedback circuitry 206 may receive a differential pair of signals 122C-N and 122C-P which may represent the current in inductor circuit 116, corresponding to power conditions in phase C of the three phase power supply of FIG. 1. Feedback circuitry 206 may generate a DC output control signal 226 indicative of, or proportional to, the current in the inductor circuit 116. As will be described below, redundant feedback circuit 208 may be used in place of, and operate in a similar manner as, feedback circuitry 202, 204 and/or 206 when circuitry 202, 204 and/or 206 is being calibrated.

There are many ways to generate the differential pair of signals 122A-N, 122A-P and 122B-N, 122B-P and 122C-N, 122C-P, which may represent the current in inductor circuit 112, 114 and 116, respectively. For example, a resistor (not shown) may be placed in series with the inductor 112, 114 and 116, and the voltage across either side of the resistor may generate the differential pair of signals. Alternatively, or additionally, the IR drop across the bottom and/or top switch (SW2 and/or SW1) may be sensed to generate a pair of signals proportional to the current in the inductor. Alternatively or additionally, the duty cycle of the PWM signals (as may be generated by PWM circuitry 216, 218 and 220) may be used to determine the inductor current. This methodology may employ an RC network (not shown) coupled between the inductor and the load. By selecting the time constant of the RC network, this network may generate a differential pair of signals proportional to the current in the inductor. Of course, those skilled in the art may recognize numerous other ways of sensing current in the inductor, and all such alternatives are deemed equivalent to the examples provided herein.

In this embodiment, one phase of the three phase circuit may be designated as a master phase, and controller 110 may compare the power in the master phase to the power in the other phase. For example, assume phase A is the master phase, controller 110 may compare the power in phase A to the power in the other two phases (phase B and phase C) to balance the power conditions in each leg of the circuit. To that end, controller circuitry 110 may also include transconductance circuitry 212 which may be capable of comparing feedback information associated with phase A to feedback information associated with phase B. For example, circuitry 212 may compare output signal 222 to output signal 224. If the load conditions in phase B are changing with respect to phase A, circuitry 212 may be capable of generating a control signal 230 indicative of, or proportional to, the changing conditions between phase A and phase B. Thus, for example, if control signal 224 is different from control signal 222, which may indicate a changing power condition between phase A and phase B, transconductance circuitry 212 may generate control signal 230 indicative such a changing condition.

PWM circuitry B 218 may compare the output control signal 230 with the oscillation signal 240, in a manner well understood in the art, to adjust the duty cycle of the PWM signals for phase B. Since control signal 230 may be generated by comparing the feedback information of phase B to the feedback information of phase A, PWM circuitry B may adjust the duty cycle of the PWM signals generated thereby to bring phase B into balance with phase A, so that, for example, the power generated by phase B is substantially identical to the power generated by phase A.

Controller circuitry 110 may also include transconductance circuitry 214 which may be capable of comparing feedback information associated with phase A to feedback information associated with phase C. For example, circuitry 212 may compare output signal 222 to output signal 226. If the load conditions in phase C are changing with respect to phase A, circuitry 214 may be capable of generating a control signal 232 indicative of, or proportional to, the changing conditions between phase A and phase C. Thus, for example, if control signal 222 is different from control signal 226, which may indicate a changing power condition between phase A and phase C, transconductance circuitry 214 may generate control signal 232 indicative of such a changing condition.

PWM circuitry C 220 may compare the output control signal 232 with the oscillation signal 240, in a manner well understood in the art, to adjust the duty cycle of the PWM signals for phase C. Since control signal 232 may be generated by comparing the feedback information of phase B to the feedback information of phase A, PWM circuitry C may adjust the duty cycle of the PWM signals generated thereby to bring phase C into balance with phase A, so that, for example, the power generated by phase C is substantially identical to the power generated by phase A.

Figure 4B:
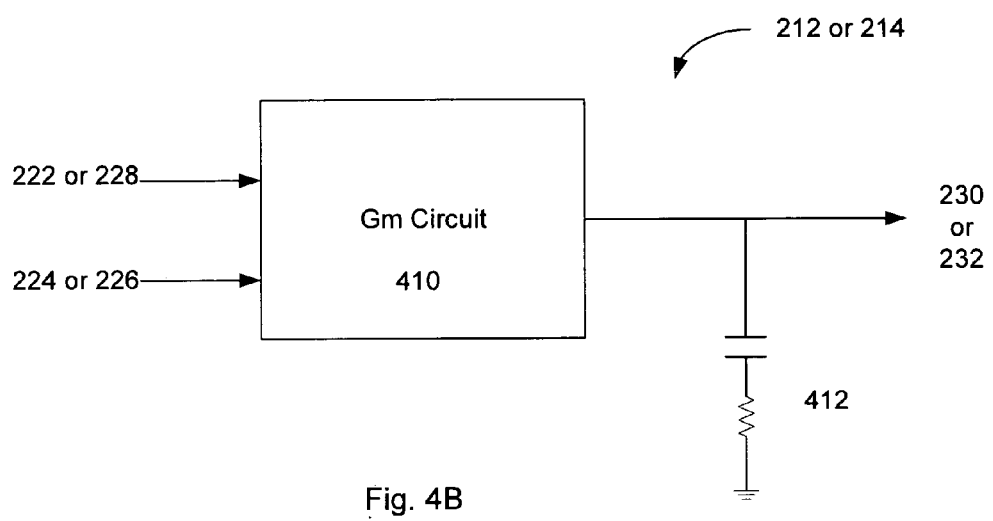
FIG. 4B is a diagram illustrating exemplary transconductance circuitry.
Figure 4C:
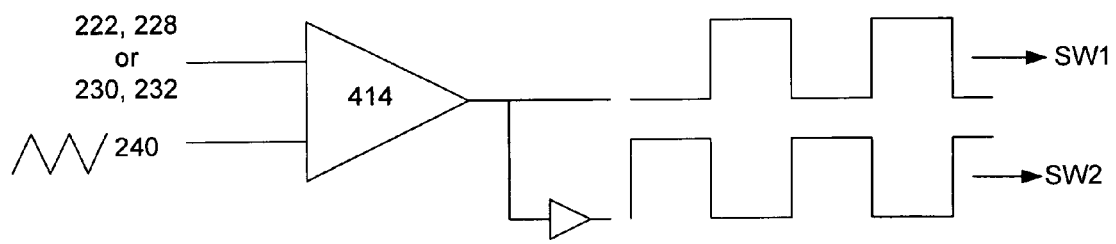
FIG. 4C is a diagram illustrating exemplary PWM circuitry.

Exemplary transconductance circuitry 212 or 214 is depicted in FIG. 4B. Circuitry 212 or 214 may include a Gm circuit which may be capable of generating an output corresponding to an input multiplied by a transconductance value (e.g., Vin=Gm×Iout), and a capacitive/resistive network 412 that is charged and discharged according to changes on the input signals. If the input signals are changing with respect to one another, the capacitor/resistive network 412 may be charged or discharged, resulting in control signal 230 or 232, which may be operable to adjust the duty cycle of the PWM signals generated by circuits 218 and 220 which may operate to adjust the power in phase B and phase C, respectively.

As stated above, feedback circuits 202, 204, 206 and 208 may each comprise differential amplifier circuitry. In this embodiment, controller circuitry 110 may be capable of calibrating the differential amplifier circuitry in one or more of the feedback circuits 202, 204, 206 and 208. Referring to FIG. 4A, an exemplary feedback circuit 202, 204, 206 or 208 is depicted. Each feedback circuit 202, 204, 206 or 208 may include a amplifier 402 that is capable of comparing a differential pair of signals, for example, 122A-N and 122A-P, which may represent the current in inductor circuit 112. During a calibration mode, the inputs to the amplifier 402 may be switched to receive a reference voltage Vref. If there is an offset or error associated with the amplifier 402, the output of the amplifier may be non-zero. Accordingly, each feedback circuit 202, 204, 206 and 208 may also include transconductance amplifier circuitry (Gm Circuit) 404. The Gm circuit 404 may receive the output of amplifier 402 and Vref. If the output of amplifier 402 is changing with respect to Vref, a charge may develop across capacitor 406. The charge across capacitor 406 may be indicative of, or proportional to, the magnitude of the difference between the output of comparator 402 and Vref. Amplifier 402 may also be capable of receiving an offset signal 408, which may be used by amplifier 402 to reduce or eliminate offset errors associated with amplifier 402.

As described above, for a three phase circuit, controller 110 may utilize feedback circuitry 202, 204 and 206, leaving redundant feedback circuitry 208. In at least one embodiment, the redundant feedback circuitry 208 may be "rotated into the loop", in place of one of feedback circuitry 202, 204 and/or 206, thus permitting feedback circuitry 202, 204 and/or 206 to be calibrated. Thus, three of the four feedback circuits may be used to sense the inductor current of respective inductor circuitry, while the other feedback circuit may be placed "offline" and calibrated. Once the calibration process is complete, the feedback circuit that has been calibrated may be recoupled to the loop and used in a manner described above.

For example, feedback circuitry 202 may be decoupled from differential inputs 122A-N and 122A-P and coupled to Vref (as depicted in FIG. 4A) and calibrated. Meanwhile, when feedback circuitry 202 is decoupled, feedback circuitry 208 may be coupled to differential inputs 122A-N and 122A-P, so that controller circuitry 110 continues to generate feedback information for all three legs of the three phase power supply. Once feedback circuitry 202 is calibrated, redundant feedback circuitry 208 may be rotated in place of feedback circuitry 204, to permit feedback circuitry 204 to be calibrated. The process may continue for any or all of the feedback circuits present in controller 110. To this end, controller circuitry 110 may also include calibration control circuitry 210, which may be capable of coupling and decoupling each of the feedback control circuits 202, 204 and 206, and the redundant feedback control circuit 208, into and out of the feedback loop to permit each and/or any of the feedback control circuits to be calibrated while also permitting continuous sampling of all legs of the three phase circuit. In one exemplary embodiment, calibration control circuitry 210 may couple and decouple each of the feedback control circuits 202, 204 and 206, and the redundant feedback control circuit 208, into and out of the feedback loop by replacing the redundant feedback control circuitry 208 for each of the other feedback control circuits 202, 204 and 206 in a sequential fashion, i.e., feedback circuitry 202 gets replaced and calibrated, then feedback circuitry 204, then 206, and the process repeats. Each feedback control circuit may be calibrated for an equal time over some arbitrary and/or selectable time period. The time period may be, for example, a number of clock cycles of a clock circuit (not shown) associated with controller 110 (e.g., 8 clock cycled for circuitry 202, 8 clock cycles for circuitry 204 and 8 clock cycles for circuitry 206). Alternatively or additionally, redundant feedback circuitry 208 may also be calibrated in a manner described above, e.g., each feedback circuit gets calibrated in every rotation.

Figure 3:
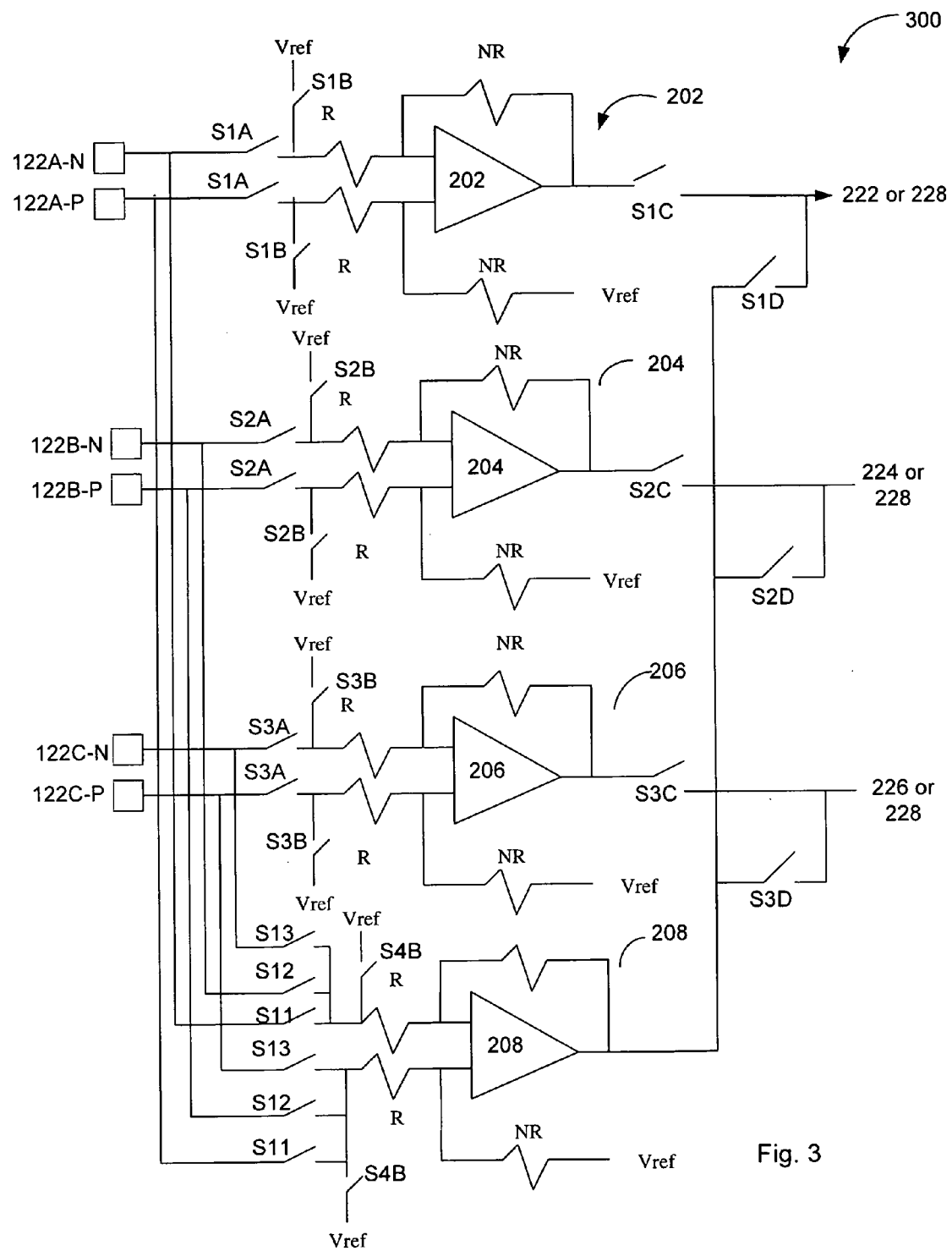
FIG. 3 is a diagram illustrating in more detail the controller circuitry of FIG. 2.

FIG. 3 is a diagram 300 illustrating in more detail a portion of the controller circuitry of FIG. 2. In FIG. 3, certain portions of the system 100 depicted in FIG. 1 and certain portions of the controller circuitry 110 of FIG. 2 have been omitted for clarity (for example, switching circuitry legs 102, 104 and 106, inductor circuitry 112, 114 and 116 and load 108), but it is to be understood that like parts of FIG. 3 can be implemented in a manner consistent with an embodiment depicted in FIG. 1 or FIG. 2, or alternatively in other system implementations, without departing from this embodiment.

In this embodiment, assume that all switches may be controlled by calibration control circuitry 210 to switch each feedback control circuit 202, 204, 206 and 208 into and out of operation to permit each to be calibrated. Also, feedback control circuits 202, 204, 206 and 208 are depicted in this embodiment as amplifier circuits 202, 204, 206 and 208 but each may be generalized as depicted in FIG. 2, and may be coupled to Gm circuitry 404 when in calibration mode, as described above in detail. Initially, in this example, we may assume that switches S1A, S2A, S3A, S1C, S2C and S3C are closed (conducting) to couple feedback circuits 202, 204 and 206 to respective differential pair input signals 122A-N, 122A-P and 122B-N, 122B-P and 122C-N, 122. Switches S4B may be closed to couple redundant feedback circuit 208 to Vref, which may permit circuit 208 to be calibrated in a manner described above. All other switches depicted in FIG. 3 may be open (non-conducting). In this configuration, feedback circuitry 202 may generate control signal 222, feedback circuitry 204 may generate control signal 224, and feedback circuitry 206 may generate control signal 226.

After a time period, as may be determined by calibration control circuitry 210 (FIG. 2), a selected feedback circuit (202, 204 or 206) may be decoupled from the differential input signals by opening switches S1A, S2A or S3A, and redundant feedback circuitry 208 may be coupled in place thereof by closing switches S11, S12 or S13. The feedback circuit that is decoupled from the differential inputs may be coupled to Vref, via switches S1B, S2B or S3B, and calibrated in a manner described in detail above. Depending on which feedback circuit is being calibrated, switch S1C, S2C or S3C may be opened and a respective switch S1D, S2D or S3D may be closed to couple the redundant feedback circuit into the feedback loop. This process may be repeated for any or all of the feedback circuits, and the process may start again to provide continuous calibration of all feedback circuits comprised in the controller IC 110.

Figure 5:
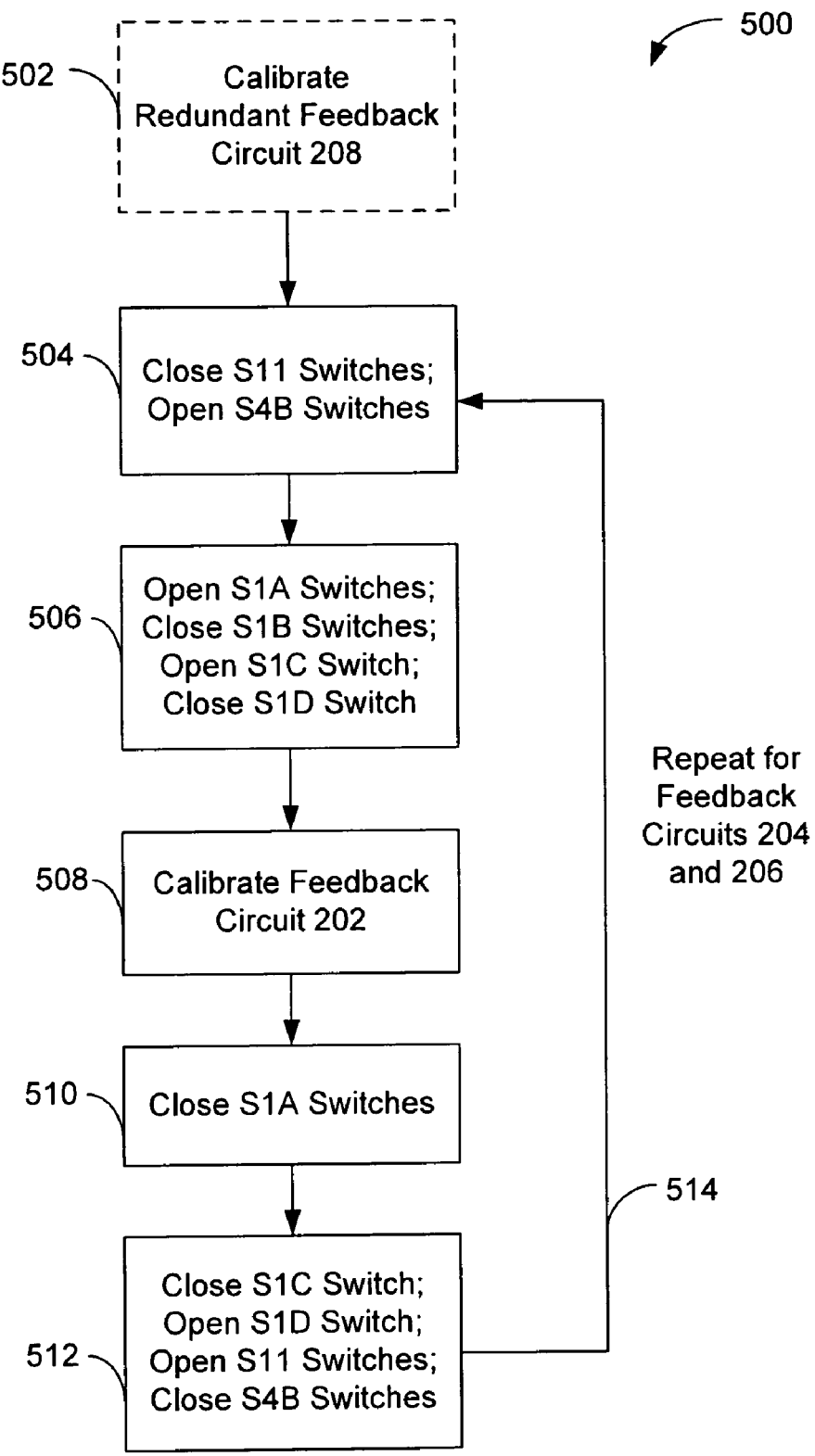
FIG. 5 is a flowchart illustrating exemplary operations according to an embodiment.

FIG. 5 is a flowchart illustrating exemplary operations 500 that may be performed according to the embodiment of FIG. 3. Operations may include calibrating a redundant feedback circuit 502. Operations may also include closing the S11 switches to couple the redundant feedback circuit intro the control loop, and opening the S4B switches to decouple the redundant feedback circuit from a reference voltage 504. Operations may further include opening the S1A switches to decouple the first feedback circuit 302 from the differential input signals, closing the S1B switches to couple the first feedback circuit to a reference voltage, opening the S1C switch to fully decouple the first feedback circuit from the control loop, and closing the S1D switch to couple the redundant feedback circuit into the control loop (e.g., in place of the first feedback circuit) 506. Operations may also include calibrating the first feedback circuit 202 to reduce or remove any offset errors associated therewith 508. Operations may further include closing the S1A switches to recouple the first feedback circuit to the differential pair input signals 510. Operations may further include closing the S1C switch to recouple the first feedback circuit into the control loop, opening the S1D switch to decouple the redundant feedback circuit from the control loop, opening the S11 switches to decouple the redundant feedback circuit from the differential pair input signals, and closing the S4B switches to recouple the redundant feedback circuit 208 to the reference voltage 512. The operations 504, 506, 508, 510 and 512 may be repeated for the other feedback circuits 514, e.g., feedback circuits 204 and 206 in this case substituting the above-operations of the S1A, S1B, S1C and S1D switches with S2A, S2B, S2C, S2D and S3A, S3B, S3C, S3D switches, respectively.

Figure 6:
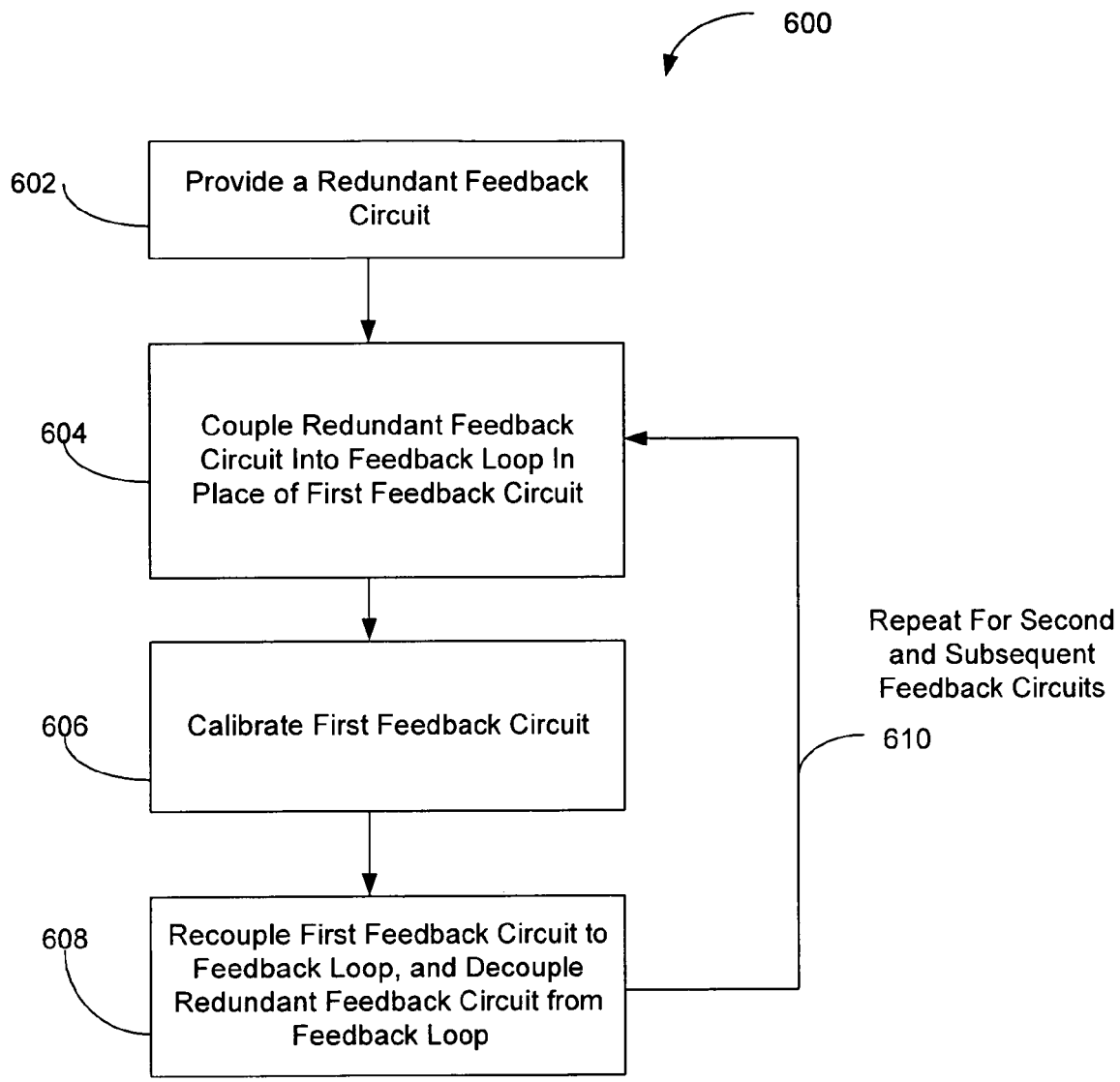
FIG. 6 is a flowchart illustrating exemplary operations according to another embodiment.

FIG. 6 is a flowchart illustrating exemplary operations 600 that may be performed according to a generalized embodiment. Operations may include providing a redundant feedback circuit 602. Operations may further include coupling the redundant feedback circuit into a feedback loop in place of a first feedback circuit (by decoupling the first feedback circuit from the feedback loop) 604. Operations may further include calibrating the first feedback circuit 606. Operations may also include recoupling the first feedback circuit to the feedback loop, and decoupling the redundant feedback circuit from the feedback loop 608. In a polyphase circuit embodiment, operations may further include repeating operations 604, 606 and 608 for second and subsequent feedback circuits.

Although the foregoing detailed description has provided examples of a polyphase circuitry operation, and in particular, three-phase circuitry, it is to be recognized that the present disclosure of a redundant feedback circuit may be employed in a single phase circuit topology.

Thus, in summary, at least one embodiment herein may provide an integrated circuit capable of generating a plurality of PWM signals to drive a plurality of DC-to-DC converter circuits, each said DC-to-DC converter circuit operating as a respective phase of a polyphase power supply to deliver polyphase power to a load. The IC of this embodiment may include a plurality of feedback circuits corresponding to the number of DC-to-DC converter circuits and a redundant feedback circuit, each of the feedback circuits and the redundant feedback circuit is capable of receiving a respective feedback signal indicative of power supplied to at least one phase. Each feedback circuit and the redundant feedback circuit is further capable of generating a control signal to control the duty cycle of selected ones of the PWM signals. The IC of this embodiment may also be capable of decoupling at least one of the plurality of feedback circuits from a respective feedback signal and, in place thereof, coupling the redundant feedback circuit to at least one respective feedback signal.

Advantageously, the integrated circuit of this embodiment may provide more accurate and continuous power monitoring than conventional circuits. Further advantageously, the integrated circuit of this embodiment may provide balanced power in the phases of a polyphase circuit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an integrated circuit (IC) capable of generating a plurality of PWM signals to drive a plurality of DC-to-DC converter circuits, each said DC-to-DC converter circuit operating as a respective phase of a polyphase power supply to deliver polyphase power to a load, said IC comprising a plurality of feedback circuits corresponding to the number of said DC-to-DC converter circuits and a redundant feedback circuit, each said plurality of feedback circuits and said redundant feedback circuit is capable of receiving a respective feedback signal indicative of power supplied to at least one said phase, and each said plurality of feedback circuits and said redundant feedback circuit is further capable of generating a control signal to control the duty cycle of selected ones of said PWM signals; said IC is capable of decoupling at least one of said plurality of feedback circuits from said respective feedback signal and, in place thereof, coupling said redundant feedback circuit to at least one said respective feedback signal.

2. The apparatus of claim 1, wherein:
said IC is further capable of coupling said decoupled feedback circuit to a reference voltage and calibrating said decoupled feedback circuit.

3. The apparatus of claim 1, wherein one said phase is designated as a master phase, and said IC further comprising:
a first transconductance circuitry receiving said control signals from said master phase and at least one other feedback circuit, said first transconductance circuitry generating a control signal to adjust the duty cycle in one said phase based on the power in said master phase; and
a second transconductance circuitry receiving said control signals from said master phase and at least one other feedback circuit different from that of said first transconductance circuitry, said second transconductance circuitry generating a control signal to adjust the duty cycle in another said phase based on the power in said master phase.

4. The apparatus of claim 1, wherein:
each said feedback circuit is replaced with said redundant feedback circuit in a sequential fashion and for a predetermined time period.

5. The apparatus of claim 1, wherein:
said feedback signal indicative of power supplied to at least one said phase comprising a differential pair of signals proportional to current in an inductor associated with a respective DC-to-DC converter circuit.

6. A system, comprising:
a plurality of DC-to-DC converter circuits, each said DC-to-DC converter circuit operating as a respective phase to deliver polyphase power to a load; and
an integrated circuit (IC) capable of generating a plurality of PWM signals to drive said plurality of DC-to-DC converter circuits, said IC comprising a plurality of feedback circuits corresponding to the number of said DC-to-DC converter circuits and a redundant feedback circuit, each said plurality of feedback circuits and said redundant feedback circuit is capable of receiving a respective feedback signal indicative of power supplied to at least one said phase, and each said plurality of feedback circuits and said redundant feedback circuit is further capable of generating a control signal to control the duty cycle of selected ones of said PWM signals; said IC is capable of decoupling at least one of said plurality of feedback circuits from said respective feedback signal and, in place thereof, coupling said redundant feedback circuit to at least one said respective feedback signal.

7. The system of claim 6, wherein:
said IC is further capable of coupling said decoupled feedback circuit to a reference voltage and calibrating said decoupled feedback circuit.

8. The system of claim 6, wherein one said phase is designated as a master phase, and said IC further comprising:
a first transconductance circuitry receiving said control signals from said master phase and at least one other feedback circuit, said first transconductance circuitry generating a control signal to adjust the duty cycle in one said phase based on the power in said master phase; and
a second transconductance circuitry receiving said control signals from said master phase and at least one other feedback circuit different from that of said first transconductance circuitry, said second transconductance circuitry generating a control signal to adjust the duty cycle in another said phase based on the power in said master phase.

9. The system of claim 6, wherein:
each said feedback circuit is replaced with said redundant feedback circuit in a sequential fashion and for a predetermined time period.

10. The system of claim 6, wherein:
said feedback signal indicative of power supplied to at least one said phase comprising a differential pair of signals proportional to current in an inductor associated with a respective DC-to-DC converter circuit.

11. The system of claim 6, wherein:
at least one said DC-to-DC converter circuit is selected from the group consisting of Buck regulator circuitry, boost regulator circuitry and Buck-boost regulator circuitry.

12. The system of claim 6, wherein:
said load comprises a microprocessor.

13. A method, comprising:
providing at least one feedback circuit corresponding to at least one DC-to-DC converter circuits;
coupling said at least one feedback circuit to a feedback control loop;
providing a redundant feedback circuit;
coupling said redundant feedback circuit to said feedback control loop and decoupling said at least one feedback circuit from said feedback control loop;
calibrating said at least one feedback circuit; and
recoupling said at least one feedback circuit to said feedback control loop and decoupling said redundant feedback circuit from said feedback control loop.

14. The method of claim 13, further comprising:
repeating said coupling, calibrating and recoupling for a second and subsequent feedback circuits.

15. An apparatus, comprising:
an integrated circuit (IC) capable of generating a plurality of PWM signals to drive at least one DC-to-DC converter circuit, said IC comprising at least one feedback circuit corresponding to said DC-to-DC converter circuit and a redundant feedback circuit, said feedback circuit and said redundant feedback circuit are capable of receiving a feedback signal indicative of power supplied to said load, and said feedback circuit and said redundant feedback circuit are further capable of generating a control signal to control the duty cycle of said PWM signals; said IC is capable of decoupling said feedback circuit from said feedback signal and, in place thereof, coupling said redundant feedback circuit to said feedback signal.

16. The apparatus of claim 15, wherein:
said IC is further capable of calibrating said decoupled feedback circuit.

* * * * *